(12) United States Patent
Kamm et al.

(10) Patent No.: US 7,651,429 B2
(45) Date of Patent: Jan. 26, 2010

(54) MULTI-SPEED TRANSMISSION

(75) Inventors: Michael Kamm, Bodnegg (DE); Gabor Diosi, Friedrichshafen (DE); Josef Haupt, Tettnang (DE); Gerhard Gumpoltsberger, Friedrichshafen (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 458 days.

(21) Appl. No.: 11/767,006

(22) Filed: Jun. 22, 2007

(65) Prior Publication Data

US 2008/0009385 A1 Jan. 10, 2008

(30) Foreign Application Priority Data

Jun. 23, 2006 (DE) .................. 10 2006 028 789

(51) Int. Cl.
*F16H 3/62* (2006.01)
(52) U.S. Cl. ........................ 475/277; 475/282
(58) Field of Classification Search ............... 475/269, 475/271, 275, 277, 282, 283, 288, 289, 296, 475/297, 311, 312, 317, 318
See application file for complete search history.

(56) References Cited

U.S. PATENT DOCUMENTS

| | | | |
|---|---|---|---|
| 4,395,925 A | 8/1983 | Gaus | |
| 5,106,352 A | 4/1992 | Lepelletier | |
| 6,139,463 A | 10/2000 | Kasuya et al. | |
| 6,176,803 B1 | 1/2001 | Meyer et al. | |
| 6,558,287 B2 | 5/2003 | Hayabuchi et al. | |
| 6,572,507 B1 | 6/2003 | Korkmaz et al. | |
| 6,634,980 B1 | 10/2003 | Ziemer | |
| 6,860,831 B2 | 3/2005 | Ziemer | |
| 6,960,149 B2 * | 11/2005 | Ziemer | 475/276 |
| 7,014,589 B2 | 3/2006 | Stevenson | |
| 7,018,319 B2 | 3/2006 | Ziemer | |
| 2004/0082428 A1 * | 4/2004 | Usoro et al. | 475/296 |
| 2004/0102276 A1 * | 5/2004 | Lee et al. | 475/271 |
| 2008/0171627 A1 * | 7/2008 | Wittkopp et al. | 475/276 |

FOREIGN PATENT DOCUMENTS

| | | |
|---|---|---|
| DE | 29 36 969 | 4/1981 |
| DE | 42 34 572 A1 | 4/1994 |
| DE | 199 12 480 | 9/2000 |
| DE | 199 49 507 | 4/2001 |

(Continued)

*Primary Examiner*—Sherry L Estremsky
*Assistant Examiner*—Edwin A. Young
(74) *Attorney, Agent, or Firm*—Davis & Bujold, P.L.L.C.

(57) ABSTRACT

A transmission with planetary gearsets (RS1, RS2, RS3, RS4), shafts and shifting elements (A, B, C, D, E). A carrier of gearset (RS2) and the input forming shaft (1). A carrier of gearset (RS3) and the output forming shaft (2). Sun gears of gearsets (RS1, RS4) couple and forming shaft (3). Ring gears of gearsets (RS1, RS4) respectively form shafts (4, 8). Sun gears of gearsets (RS2, RS3) forming shaft (5). A carrier and a ring gear of respective gearsets (RS1, RS3) forming shaft (6). A ring gear and a carrier of respective gearsets (RS2 RS4) forming shaft (7). In the direction of power flow, element (A) is located between shaft (3) and a housing, element (B) between shaft (4) and the housing, element (C) between two of shafts (1, 5, 7), element (D) between shafts (6, 8), and element (E) between shafts (5, 8).

38 Claims, 6 Drawing Sheets

FOREIGN PATENT DOCUMENTS

| | | |
|---|---|---|
| DE | 199 49 507 A1 | 4/2001 |
| DE | 100 83 202 T1 | 1/2002 |
| DE | 101 15 983 | 10/2002 |
| DE | 101 15 987 | 10/2002 |
| DE | 101 15 995 | 10/2002 |
| DE | 102 13 820 | 10/2002 |
| DE | 10 2004 029 952 A1 | 1/2005 |
| DE | 10 2005 002 337 | 8/2006 |
| DE | 10 2005 002 337 A1 | 8/2006 |
| DE | 10 2005 032 001 A1 | 2/2007 |
| EP | 0 434 525 | 6/1991 |

* cited by examiner

| Gear | Engaged Shifting Elements | | | | | Ratio $\lambda$ | Step $\varphi$ |
|---|---|---|---|---|---|---|---|
| | Brake | | Clutch | | | | |
| | A | B | C | D | E | | |
| 1 | ● | ● | ● | | | 4.70 | |
| 2 | ● | ● | | | ● | 3.08 | 1.53 |
| 3 | | ● | ● | | ● | 2.10 | 1.46 |
| 4 | | ● | | ● | ● | 1.69 | 1.24 |
| 5 | | ● | ● | ● | | 1.31 | 1.29 |
| 6 | | | ● | ● | ● | 1.00 | 1.31 |
| 7 | ● | | ● | ● | | 0.82 | 1.21 |
| 8 | ● | | | ● | ● | 0.65 | 1.26 |
| R | ● | ● | | ● | | -2.94 | Total 7.18 |

Fig. 4

MULTI-SPEED TRANSMISSION

This application claims priority from German Application Serial No. 10 2006 028 789.4 filed Jun. 23, 2006.

FIELD OF THE INVENTION

The invention relates to a multi-speed transmission in planetary design, especially an automatic transmission for a motor vehicle, comprising an input shaft, an output shaft, four planetary gearsets, at least eight rotary shafts, as well as five shifting elements, whose selective engagement produces various gear ratios between the input shaft and the output shaft, so that eight forward gears and at least one reverse gear can be implemented.

BACKGROUND OF THE INVENTION

Automatic transmissions, especially for motor vehicles, comprise, according to the state of the art, planetary gearsets, which are shifted by means of friction or shifting elements, such as clutches and brakes, and are usually connected to a starting element subjected to a slip effect and are selectively provided with a lockup clutch, such as a hydrodynamic torque converter or a fluid clutch.

Within the scope of the applicant's DE 101 15 983 A1 is described, for example, a multi-speed transmission comprising an input shaft which is connected to a front-mounted gear set, an output shaft, which is connected to a rear-mounted gear set, and a maximum of seven shifting elements, whose selective shifting allows at least seven forward gears to be shifted into without a range shift. The front-mounted gear set consists of one shiftable or non-shiftable planetary gearset or a maximum of two non-shiftable mutually coupled planetary gearsets. The rear-mounted set is configured as a two-carrier, four-shaft transmission with two shiftable planetary gearsets, and has four free shafts. The first free shaft of this two-carrier, four-shaft transmission is connected to the first shifting element, the second free shaft is connected to the second and third shifting elements, the third free shaft is connected to the fourth and fifth shifting elements, and the fourth free shaft is connected to the output shaft. For a multi-speed transmission with a total of six shifting elements, it is proposed, according to the invention, to connect the third free shaft or the first free shaft of the rear-mounted gear set additionally to a sixth shifting element. For a multi-speed transmission with a total of seven shifting elements, it is proposed according to the invention to connect the third free shaft in addition to a sixth shifting element, and to connect the first free shaft to a seventh shifting element.

Several other multi-speed transmissions are known, for example, from German Patent 101 15 995 A1 of the applicant, in which four shiftable mutually coupled planetary gearsets and six or seven friction-locking shifting elements are provided, whose selective engagement allows a rotational speed of an input shaft of the transmission to be transmitted to an output shaft of the transmission in such a way that nine or eleven forward gears and at least one reverse gear can be shifted into. Two or three shifting elements are engaged in each gear according to the schematic diagram, while during shifting from one gear to the respectively following higher or lower gear only one engaged shifting element is disengaged and a previously disengaged shifting element is engaged in order to prevent range shifting.

In the related unpublished patent application DE 102005002337.1 of the applicant, a multi-speed transmission with an input shaft, an output shaft, four mutually coupled separate planetary gearsets, and five shifting elements is furthermore proposed, in which eight forward gears can be shifted into without range shifting, that is, in such a way that during a change from a forward gear into the following higher or lower forward gear, respectively, only one of the previously engaged shifting elements is disengaged and only one of the previously disengaged gears is engaged. The multi-speed transmission also has a reverse gear. Three shifting elements are respectively engaged in all forward gears and in the reverse gear. With regard to kinematic coupling of the four planetary gearsets among each other and to the input shaft and output shaft, it is provided that a carrier of the fourth planetary gearset and the input shaft are connected to each other and form a first shaft of the transmission, a carrier of the third planetary gearset and the Output shaft are connected to each other and form a second shaft of the transmission, a sun gear of the first planetary gearset and a sun gear of the fourth planetary gearset are connected to each other and form a third shaft of the transmission, a ring gear of the first planetary gearset forms a fourth shaft of the transmission, a ring gear of the second planetary gearset and a sun gear of the third planetary gearset are connected to each other and form a fifth shaft of the transmission, a carrier of the first planetary gearset and a ring gear of the third planetary gearset are connected to each other and form a sixth shaft of the transmission, a sun gear of the second planetary gearset and a ring gear of the fourth planetary gearset are connected to each other and form a seventh shaft of the transmission, and a carrier of the second planetary gearset forms an eighth shaft of the transmission. With regard to kinematic coupling of the five shifting elements to the four planetary sets and to the input shaft and output shaft, it is provided that the first shifting element is arranged within the direction of the power flow between the third shaft and a housing of the transmission, the second shifting element is arranged between the fourth shaft and the housing of the transmission, the third element is arranged between the first and fifth shaft, the fourth shifting element is arranged either between the eighth and second shafts or between the eighth and the sixth shafts, and the fifth shifting element is arranged either between the seventh and fifth shafts or between the seventh and eighth shafts or between the fifth and eighth shafts.

Automatically shiftable motor vehicle transmissions in planetary design have already been frequently described in the state of the art and are being continuously further developed and improved. These transmissions should have a sufficient number of forward gears as well as one reverse gear with a transmission ratio having a high overall spread as well as very advantageous progressive ratios, which is well suited for motor vehicles. These should furthermore make possible a high startup transmission ratio in the forward direction and include a direct gear as well as be suitable for use in passenger cars as well as in commercial vehicles. These transmissions should furthermore require a low construction expenditure, in particular a small number of shifting elements, and prevent double shifting while sequentially shifting, so that only one shifting element is changed during shifting into subsequent gears.

SUMMARY OF THE INVENTION

It is the object of the invention to propose a multi-speed transmission of the type mentioned above, having at least eight shiftable forward gears without range shifting and at least one reverse gear, in which the lowest possible number of shifting elements is required when utilizing a total of four planetary gearsets.

The transmission should, in addition, have a large ratio spread with comparatively harmonious gear gradation and an advantageous efficiency at least in the main travel gears, that is, comparatively low drag and gearing losses.

The multi-speed transmission in planetary design according to the invention is based on the schematic diagram of the related patent application DE 102005002337.1 of the applicant and has an input shaft, an output shaft, four mutually coupled planetary gearsets, at least eight rotary shafts, as well as five shifting elements (two brakes and three clutches), whose selective engagement produces various transmission ratios between the input shaft and the output shaft, so that eight forward gears and one reverse gear can be realized. Three of the five shifting elements are engaged at all times in each gear, while during shifting from a forward gear into the next following higher or lower forward gear only one of the previously engaged shifting elements is disengaged and only one of the previously disengaged shifting elements is engaged.

It is proposed, according to the invention, that:

a carrier of the second planetary gearset and the input shaft are permanently connected to each other and form the first shaft of the transmission;

a carrier of the third planetary gearset and the output shaft are permanently connected to each other and form the second shaft of the transmission;

a sun gear of the first planetary gearset and a sun gear of the fourth planetary gearset are permanently connected to each other and form the third shaft of the transmission;

a ring gear of the first planetary gearset forms the fourth shaft of the transmission;

a sun gear of the second planetary gearset and a sun gear of the third planetary gearset are permanently connected to each other and form the fifth shaft of the transmission;

a carrier of the first planetary gearset and a ring gear of the third planetary gearset are permanently connected to each other and form the sixth shaft of the transmission;

a ring gear of the second planetary gearset and a carrier of the fourth planetary gearset are permanently connected to each other and form the seventh shaft of the transmission;

a ring gear of the fourth planetary gearset forms the eighth shaft of the transmission;

the first shifting element is arranged within the direction of the power flow between the third shaft and a housing of the transmission;

the second shifting element is arranged within the direction of the power flow between the fourth shaft and the housing of the transmission;

the third shifting element is arranged either between the fifth and seventh shafts or between the first and fifth shafts or between the first and seventh shafts of the transmission;

the fourth shifting element is arranged within the direction of the power flow between the sixth and eighth shaft of the transmission; and the fifth shifting element is arranged within the direction of the power flow between the fifth and eighth shafts of the transmission.

The multi-speed transmission of the invention differs from the related multi-speed transmission in accordance with DE 102005002337.1 in that the first shaft of the transmission is henceforth formed by the carrier of the second planetary gearset and the input shaft connected to this carrier, the fifth shaft of the transmission is henceforth formed by the mutually connected sun gears of the second and third planetary gearsets, the seventh shaft of the transmission is henceforth formed by the ring gear of the second planetary gearset and the carrier of the fourth planetary gearset connected to this ring gear, the eighth shaft of the transmission is henceforth formed by the ring gear of the second planetary gearset, and the third shifting element is henceforth selectively arranged either between the fifth and seventh or between the first and fifth or between the first and seventh shafts of the transmission.

As in the related multi-speed transmission in accordance with DE 102005002337.1, it also applies to the multi-speed transmission that the first forward gear is implemented by engaging the first, second and third shifting elements, the second forward gear is implemented by engaging the first, second and fifth shifting elements, the third forward gear is implemented by engaging the second, third and fifth shifting elements, the fourth forward gear is implemented by engaging the second, fourth and fifth shifting elements, the fifth forward gear is implemented by engaging second, third and fourth shifting elements, the sixth forward gear is implemented by engaging the third, fourth and fifth shifting elements, the seventh forward gear is implemented by engaging the first, third and fourth shifting elements, the eighth forward gear is implemented by engaging the first, fourth and fifth shifting elements, and the reverse gear is implemented by engaging the first, second and fourth shifting elements.

Three of the four planetary gearsets are configured as so-called negative planetary gearsets, whose respective planetary gears mesh with the sun gear and ring gear of the respective planetary gearset. One of the four planetary gearsets (specifically the second planetary gearset) is configured as a so-called positive planetary gearset with mutually meshing inner and outer planetary gears, wherein these inner planetary gearsets also mesh with the sun gear of this positive planetary gearset, and these outer planetary gearsets also mesh with the ring gear of this positive planetary gearset. With regard to the spatial arrangement of the four planetary gearsets within the housing of the transmission, it is proposed in an advantageous embodiment to arrange the four planetary gearsets coaxially side by side in a "first, fourth, second, third planetary gearset" sequential order.

The spatial arrangement of the shifting elements of the multi-speed transmission of the invention within their transmission housing is basically restricted only by the dimensions and the external configuration of the transmission housing. Numerous suggestions with regard to the spatial arrangement and constructive design of the shifting elements can be inferred, for example, from the related patent application DE 102005002337.1.

In a variation that is advantageous for a standard drive with regard to the arrangement of the shifting elements, it can thus be provided, for example, that the first and the second shifting elements are arranged from a spatial perspective at least partially within an area located radially above the first or fourth planetary gearset, and the fourth and fifth shifting elements are arranged from a spatial perspective at least partially within an area located axially between the second and third planetary gearsets, and the third shifting element is either likewise at least partially arranged within an area located axially between the second and third planetary gearsets or at least partially within an area located axially between the fourth and second planetary gearsets. A common disk carrier can be provided in an advantageous constructive embodiment for the fourth and fifth switching elements, while the fourth and fifth shifting elements can be arranged from a spatial perspective at least partially axially side by side or at least partially radially superimposed. If the disk sets of the second and third shifting elements are arranged within an area located axially between the second and third planetary gearsets, then a common disk carrier can also be provided for the third and fifth shifting elements, while the disk sets of the third and fifth shifting elements are then preferably arranged axially side by side. The first and second shifting elements can also be arranged from a spatial perspective preferably axially side by side or at least partially radially superimposed.

Gear ratios with a large overall spread in harmonic gear gradation suited for passenger cars are obtained especially by means of the embodiment of the multi-speed transmission of the invention. The construction expense is furthermore comparatively low with the multi-speed transmission of the invention due to a small number in shifting elements, namely two brakes and three clutches. Good efficiency is obtained, on the one hand, with the multi-speed transmission according to the invention as a consequence of the low drag losses, since only two shifting elements are unengaged in each gear, and on the other hand, as a consequence of the low gearing losses in the simply designed individual planetary gearsets.

In addition to this, it is also advantageously possible with the multi-speed transmission of the invention to initiate starting with a hydrodynamic converter, an external starting clutch, or also with other suitable external starting elements. It is also conceivable to enable the startup process with a starting element incorporated into the transmission. One of the two brakes actuated in the first and second forward gears and in the reverse gear is preferably suitable for this purpose.

The multi-speed transmission of the invention is moreover designed in such a way that adaptability to different power train configurations within the direction of the power flow direction as well as from the spatial point of view is made possible. In this way, it is possible, for example, without special design measures, to arrange the input and output of the transmission selectively coaxially or axially parallel to each other.

For an application with input shaft and output shaft extending coaxially in relation to each other, it is appropriate, for example, that the first planetary gearset of the planetary gearset group, according to the invention, closest the input of the transmission. Depending on the spatial arrangement of the five shifting elements within the transmission housing, it can moreover be provided that all four planetary gearsets are advantageously axially, centrally passed through, in each case by, at most by one shaft of the transmission. In connection with the previously mentioned shifting element configuration in conjunction with the arrangement of the four planetary gearsets coaxially side by side in the sequential order of "first, fourth, second, third planetary gearset" and the arrangement of the first and second shifting elements closest the input, even then the first and fourth planetary gearsets are centrally passed through by only one shaft in axial direction, namely by the first shaft or the input shaft of the transmission. The design configuration of the pressure and lubricant supply to the servos of the individual shifting elements is correspondingly simple.

For an application with the input shaft and the output shaft extending axially parallel or at an angle to each other, the first or the third planetary gearset can be arranged on the side of the transmission housing, closest the drive motor, that is operatively connected to the input shaft. If the first planetary gearset is closest the input of the transmission, then it can be provided (as with a coaxial arrangement of the input shaft and the output shaft according to the spatial arrangement of the five shifting elements inside the transmission housing) that all four planetary gearsets are respectively centrally passed through in the axial direction at most by one shaft of the transmission, especially that only the first and fourth planetary gearsets are passed through centrally only by one shaft, specifically only by the first shaft of the transmission.

If, instead, the third planetary gearset is closest the input of the transmission, in which an input and an output that are not arranged coaxially with respect to each other, the first and fourth planetary gearsets do not have to be centrally passed through in the axial direction by a shaft of the transmission. In connection with the above-mentioned arrangement of the third, fourth and fifth shifting elements, only the second and third planetary gearsets are centrally passed through in the axial direction by only one shaft, namely by the first shaft or the input shaft of the transmission.

In all cases, the third shaft of the transmission, which is formed, at least in part, by the sun gears of the first and fourth planetary sets, can be rotatably mounted on a hub, which is fixed on the transmission housing. If the first planetary gearset faces the input of the transmission, this aforementioned housing-mounted hub is a component of the input-side transmission housing wall, or otherwise a component of the housing wall opposite the drive motor.

BRIEF DESCRIPTION OF THE DRAWINGS

The invention will be explained in greater detail with reference to the examples depicted in the drawings. Identical or similar components are here provided with identical reference numerals.

In the drawings:

FIG. 4 shows an exemplary schematic diagram of the multi-speed transmission according to FIGS. 1, 2 and 3;

DETAILED DESCRIPTION OF THE INVENTION

Figure 1:
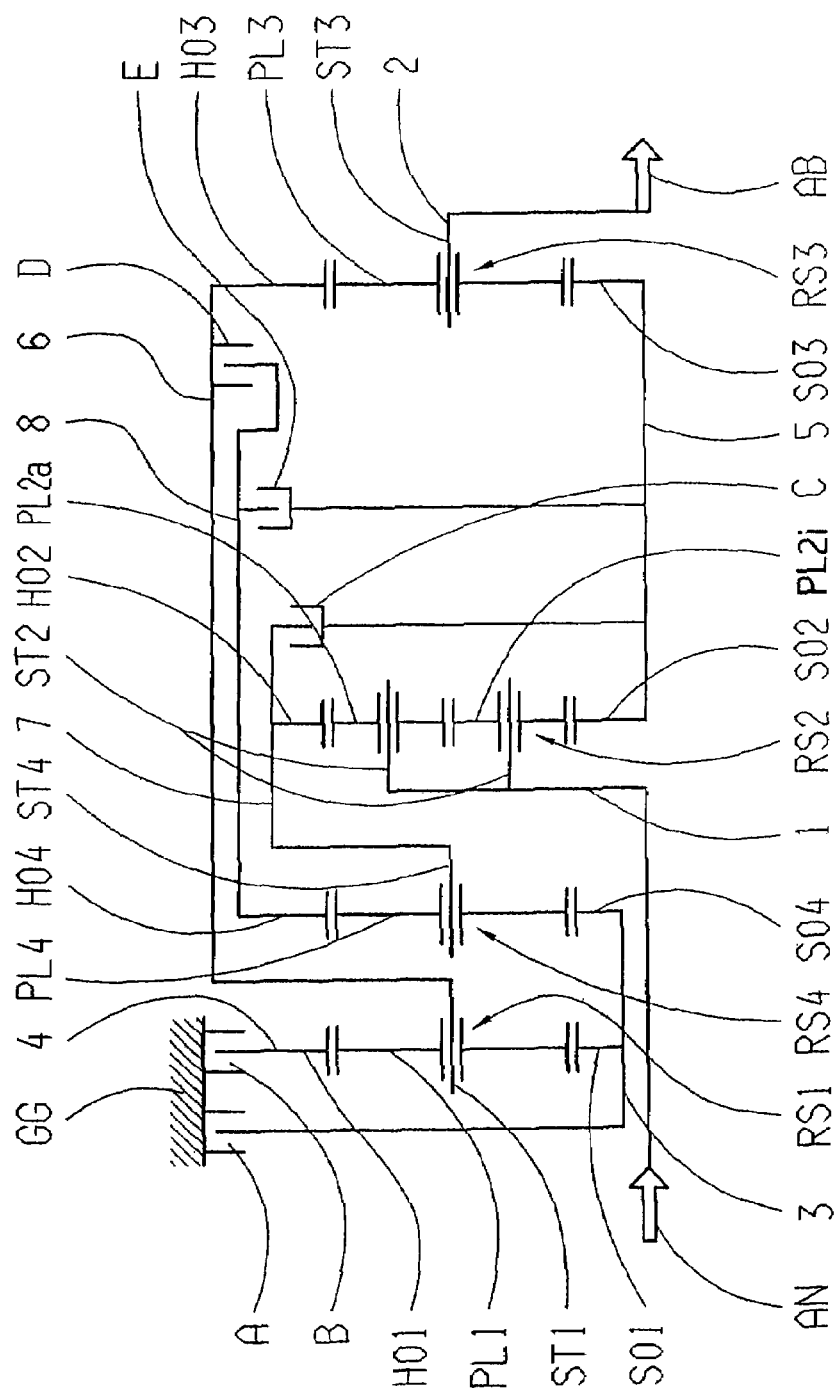
FIG. 1 shows a schematic representation of a first embodiment of a multi-speed transmission according to the invention.

FIG. 1 shows a first embodiment of a multi-speed transmission according to the invention in schematic representation. The transmission comprises an input shaft AN and an output shaft AB as well as four planetary gearsets RS1, RS2, RS3, RS4 and five shifting elements A, B, C, D, E, which are all arranged within a housing GG of the transmission. The four planetary gearsets RS1, RS2, RS3, RS4 are arranged in this embodiment coaxially one behind the other in the sequential order of "RS1, RS4, RS2, RS3" in the axial direction. The planetary gearsets RS1, RS3 and RS4 are configured as simple negative planetary gearsets. A negative planetary gearset is known to have planetary gears that mesh with the sun gear and the ring gear of this planetary gearset. The ring gears of the planetary gearsets RS1, RS3, RS4 are identified with HO1, HO3 and HO4, the sun gears are identified with SO1, SO3, and SO4, the planetary gears are identified with PL1, PL3 and PL4 and the carriers, on which the aforementioned planetary gears are rotatably mounted, are identified with ST1, ST3 and ST4. The planetary gearset RS2 is configured as a simple positive planetary gearset with double planetary design. A positive planetary gearset is known to have mutually meshing inner and outer planetary gears, wherein these inner planetary gears also mesh with the sun gear of this planetary gearset, and these outer planetary gears also mesh with the ring gear of this planetary gearset. The ring gear of this planetary gearset RS2 is identified with HO2, the sun gear is identified with SO2, the inner planetary gears are identified with PL2$i$, the outer planetary gears are identified with PL2$a$, and the carrier, on which the inner and outer planetary gears PL2$i$, PL2$a$ are rotatably mounted, is identified with ST2. The shifting elements A and B are configured as brakes, which in the represented exemplary embodiment are both configured as frictionally engaged shiftable disk brakes, but can of course in another configuration also be configured as frictionally engaged shiftable band brakes, or, for example, also as positive shiftable claw or cone brakes. The shifting elements C, D and E are configured as clutches, which in the illustrated exemplary embodiment are all frictionally engaged shiftable disk clutches, but can of course in another configuration also be configured as positive shiftable claw or cone clutches. Selective shifting of eight forward gears and at least one reverse gear can be implemented with these five shifting elements A to E. The multi-speed transmission of the invention has a total of at least eight rotatable shafts, which are identified with reference numerals 1 through 8.

The following is provided with regard to the kinematic coupling of the individual elements of the four planetary gearsets RS1, RS2, RS3, RS4 among each other and to the input shaft AN and the output shaft AB: The carrier ST2 of the second planetary gearset RS2 and the input shaft AN are permanently connected to each other and form the shaft 1. The carrier ST3 of the third planetary gearset RS3 and the output shaft AB are permanently connected to each other and form the shaft 2. The sun gear SO1 of the first planetary gearset RS1 and the sun gear SO4 of the fourth planetary gearset RS4 are permanently connected to each other and form the shaft 3. The ring gear HO1 of the first planetary gearset RS1 forms the shaft 4. The sun gear of the second planetary gearset RS2 and the sun gear SO3 of the third planetary gearset RS3 are permanently connected to each other and form the shaft 5. The carrier ST1 of the first planetary gearset RS1 and the ring gear HO3 of the third planetary gearset RS3 are permanently connected to each other and form the shaft 6. The ring gear HO2 of the second planetary gearset RS2 and the carrier ST4 of the fourth planetary gearset RS4 are permanently connected to each other and form the shaft 7. The ring gear HO4 of the fourth planetary gearset RS4 forms the shaft 8.

The following is provided with regard to the kinematic coupling of the five shifting elements A through E to the shafts 1 to 8 of the transmission described in this way in connection with the multi-speed transmission according to FIG. 1: The brake A is arranged as first shifting element within the direction of the power flow between the shaft 3 and a housing GG of the transmission. The brake B is arranged as second shifting element within the direction of the power flow between the shaft 4 and the housing GG. The clutch C is arranged as third shifting element within the direction of the power flow between the shaft 5 and the shaft 7. The clutch D is arranged as fourth shifting element within the direction of the power flow between the shaft 6 and the shaft 8. The clutch E is arranged as fifth shifting element within the direction of the power flow between the shaft 5 and the shaft 8.

In the exemplary embodiment shown in FIG. 1, the first planetary gearset RS1 is the gear set of the transmission that is positioned close to the input and the third planetary gearset RS3 is the gear set of the transmission positioned close to the output, wherein the input shaft AN and the output shaft AB are arranged, for example, coaxially with respect to each other. It is obvious to the person skilled in the art that this transmission can be modified without particular expenditure, so that the input shaft and the output shaft are no longer arranged coaxially with respect to each other, but are arranged, for example, axially parallel or at an angle with respect to each other. With an arrangement such as this, the person skilled in the art will also be able to arrange the input of the transmission closest the third planetary gearset RS3, if required, that is, on the side of the third planetary gearset RS3 that further from the first planetary gearset RS1.

The spatial arrangement of the shifting elements of the exemplary embodiment of a multi-speed transmission according to the invention depicted in FIG. 1 can be freely selected in principle, and is only limited by the dimensions and the outer shape of the transmission housing GG.

In the exemplary embodiment shown in FIG. 1, the two brakes A, B are arranged from a spatial perspective within the area of the first planetary gearset RS1, which is closest to the input, and thus axially side by side, wherein the kinematic connection of the two brakes A, B on the first planetary gearset RS1 causes the brake B to be arranged closer to the fourth planetary gearset RS4, which is adjacent to the first planetary gearset RS1, than the brake A, or the brake A to be arranged closer to the input of the transmission than the brake B. From a spatial perspective, the brake B is at least partially arranged within an area located radially above the first planetary gearset RS1, and the brake A is correspondingly arranged on the side of the first planetary gearset RS1 (close to the input) further from the fourth planetary gearset RS4. An inner disk carrier of the brake A forms a section of the shaft 3 of the transmission and is connected on the side of the first planetary gearset RS1 further from the fourth planetary gearset RS4 in a rotationally fixed manner to the sun gear SO1 of this gear set. Sections of the shaft 3 are configured as a kind of sun shaft, which connects the sun gears SO1, SO4 of the planetary gearsets RS1, RS4 to each other. In this connection, the shaft 3 can be rotated on the input shaft AN and also on a hub fixed to the transmission housing (not depicted in greater detail in FIG. 1). An inner disk carrier of the brake B forms a section of the shaft 4 of the transmission and, is connected to the ring gear HO1 of the first planetary gearset RS1 in a rotationally fixed manner. The outer disk carriers of the brakes A and B can each be integrated in the housing GG or can also be configured as separate components, which are then coupled to the housing GG in a rotationally fixed manner. The servos that are necessary for actuation of the friction elements of the two brakes A, B are not depicted in greater detail in FIG. 1 for the sake of simplicity and can be incorporated, for example, into the transmission housing GG or a housing cover fixed on the transmission housing, or can also be mounted axially displaceably.

The person skilled in the art will modify this exemplary spatial arrangement of the two brakes A, B as needed without particular inventive effort. The brake A can thus also be arranged, for example, at least partially radially above the first planetary gearset RS1 and the brake B can be arranged at least partially radially above the fourth planetary gearset RS4. In still another embodiment, both brakes A, B can be arranged, for example, radially above each other and axially adjacent to the first planetary gearset RS1 on a side further from the fourth planetary gearset RS4, wherein the brake B is then arranged, for example, on a larger diameter than the brake A.

As can also be seen in FIG. 1, at least the disk sets of the clutches C, D, E are arranged from a spatial perspective at least partially within an area located axially between the second and the third planetary gearsets RS2, RS3. The servos of the three clutches C, D, E that are necessary for actuating these disk sets are not depicted in greater detail in FIG. 1 for the sake of simplicity.

The clutch C, which locks the second planetary gearset RS2 in the engaged or shifted status, axially directly borders the second planetary gearset RS2 (on the side of the gear set closer the third planetary gearset RS3). An outer disk carrier of the clutch C is connected in a rotationally fixed manner to the ring gear HO2 of the second planetary gearset RS2 on the side of the disk set of the clutch C closer the second planetary gearset RS2 and is thus connected in a rotationally fixed manner to the carrier ST4 of the fourth planetary gearset RS4, via this ring gear HO2, and can therefore also be referred to as a section of the shaft 7 of the transmission. An inner disk carrier of the clutch C is connected in a rotationally fixed manner to the sun gears SO2, SO3 of the second and third planetary gearsets RS2, RS3, and can therefore also be referred to as a section of the shaft 5 of the transmission. The servo necessary for the actuation of the disk set of the clutch C can be mounted axially displaceably, for example, on the inner disk carrier of the clutch C, to rotate permanently at the rotational speed of the shaft 5. The servo of the clutch C, however, can also be arranged within the cylinder chamber formed by the outer disk carrier of the clutch C, and the servo of the clutch can be mounted axially displaceably on this outer disk carrier to rotate permanently at the rotational speed of the shaft 7. In order to equalize the rotational pressure of the rotating pressure chamber of this servo, the clutch C can be provided in a known manner with dynamic pressure compensation.

As can further be seen in FIG. 1, the clutch D is directly adjacent the third planetary gearset RS3 (on the gear set's side closer the second planetary gearset RS2). An outer disk carrier of the clutch D is connected on a side closer the third planetary gearset RS3 in a rotationally fixed manner to the ring gear HO3 of this set and at its side closer the second planetary gearset RS2 to the carrier ST1 of the first planetary gearset RS1, and can therefore be referred to as a section of the shaft 6 of the transmission. An inner disk carrier of the clutch D is connected in a rotationally fixed manner to the ring gear HO4 of the fourth planetary gearset RS4 and forms a section of the shaft 8 of the transmission. In addition, the inner disk carrier of the clutch D is connected in a rotationally fixed manner to an outer disk carrier of the clutch E. The servo that is necessary for actuation of the disk set of the clutch D can be arranged, for example, within the cylinder chamber formed by the outer disk carrier of the clutch D and can be mounted axially displaceably on the outer disk carrier of the clutch D to rotate permanently at the rotational speed of the shaft 6. The servo of the clutch D can also be mounted axially displaceably on the inner disk carrier of the clutch D to rotate permanently at the rotational speed of the shaft 8. In order to equalize the rotational pressure of the rotating pressure chamber of this servo, the clutch D can be provided in a known manner with dynamic pressure compensation.

As can also be seen in FIG. 1, the disk set of the clutch E is arranged, from a spatial perspective, within an area located axially between the disk sets of the other two clutches C, D. As already indicated, the outer disk carrier of the clutch E forms a further section of the shaft 8 of the transmission. An inner disk carrier of the clutch E (and also the inner disk carrier of the clutch C) is connected in a rotationally fixed manner to the sun gears SO2, SO3 of the second and third planetary gearsets RS2, RS3. It is easy for the person skilled in the art to see that several possibilities result in this way for configuring component groups, which are advantageous from the point of view of the production.

A design embodiment can thus be provided, wherein a common disk carrier is provided for the clutches C and E, and is connected to the sun gears SO2, SO3 of the second and third planetary gearsets RS2, RS3. A common disk carrier such as this is configured, for example, as a common inner disk carrier for the clutches C, E, in order to accommodate disk sets of these two clutches C, E, which sets are preferably arranged axially side by side on the same diameter, wherein the disk set of the clutch C is then arranged closer the second planetary gearset RS2 than the disk set of the clutch E. In this case, it is also advantageous if the servo of the clutch C and the servo necessary for actuation of the disk set of the clutch E are mounted axially displaceably on the common inner dusk carrier, wherein dynamic pressure compensation can be provided in order to equalize the rotational pressure of the pressure chambers of both servos for both clutches C, E produced by the rotation at the rotational speed of the shaft 5.

In another design embodiment, a common disk carrier is provided for clutches D and E, and is connected to the ring gear HO4 of the fourth planetary gearset RS4 and is configured, for example, as an inner disk carrier for the clutch D and as an outer disk carrier for the clutch E. The disk sets of these two clutches D, E can be arranged from a spatial perspective axially side by side or also at least partially radially superimposed. If the disk sets of the clutches D, E are arranged from a spatial perspective (at least partially) radially superimposed, then the disk set of the clutch E is preferably arranged on a smaller diameter than the disk set of the clutch D. If the disk sets of the clutches D, E are arranged from a spatial perspective (at least partially) axially side by side, then the disk set of the clutch D can be provided closer to the third planetary gearset RS3 (as shown in the exemplary embodiment depicted in FIG. 1) than the disk set of the clutch E. In another design embodiment of the transmission, it can also be provided, however, that the disk set of the clutch E is arranged closer to the third planetary gearset RS3 than the disk set of the clutch D, wherein the clutch E is then directly adjacent the third planetary gearset RS3.

In accordance with the gear set diagram corresponding to the sequence "RS1, RS4, RS2, RS3" of the four planetary gearsets RS1, RS2, RS3, RS4 and in accordance with the arrangement of the three clutches C, D, E within an area located axially between the second and third planetary gearsets RS2, RS3, the shaft 6 of the transmission, in its axial span, completely overlaps the fourth planetary gearset RS4, the two clutches C and E, the second planetary gearset RS2, as well as the clutch D.

It should be expressly pointed out that the above-described arrangement of the five shifting elements A, B, C, D, E should only be viewed as an example. If required, the person skilled in the art will also modify this exemplary spatial arrangement of the five shifting elements A, B, C, D, E. Numerous suggestions for this can be derived, for example, from the related patent application DE 1002005002337.1.

Figure 2:
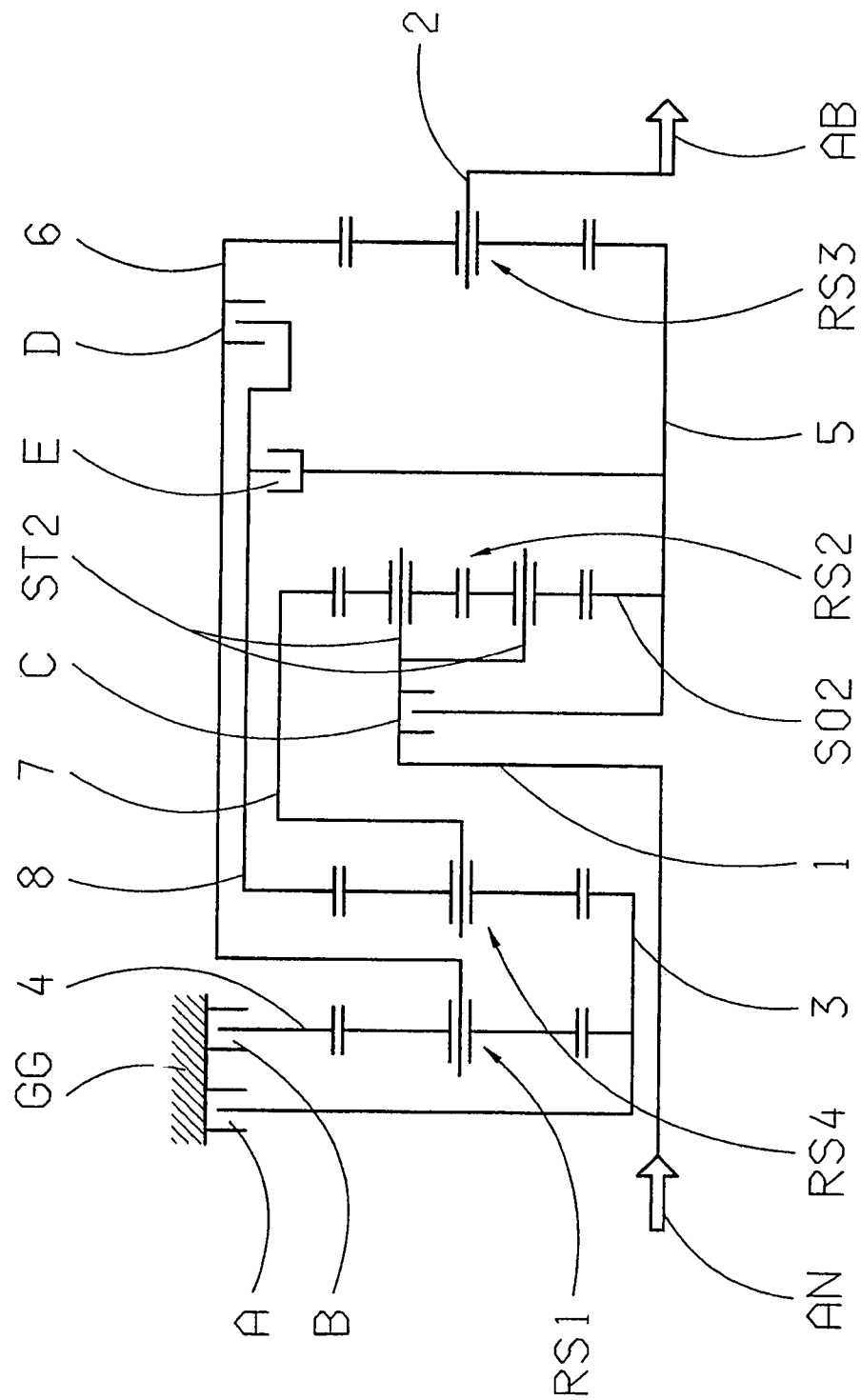
FIG. 2 shows a schematic representation of a second exemplary embodiment of a multi-speed transmission according to the invention.
Figure 3:
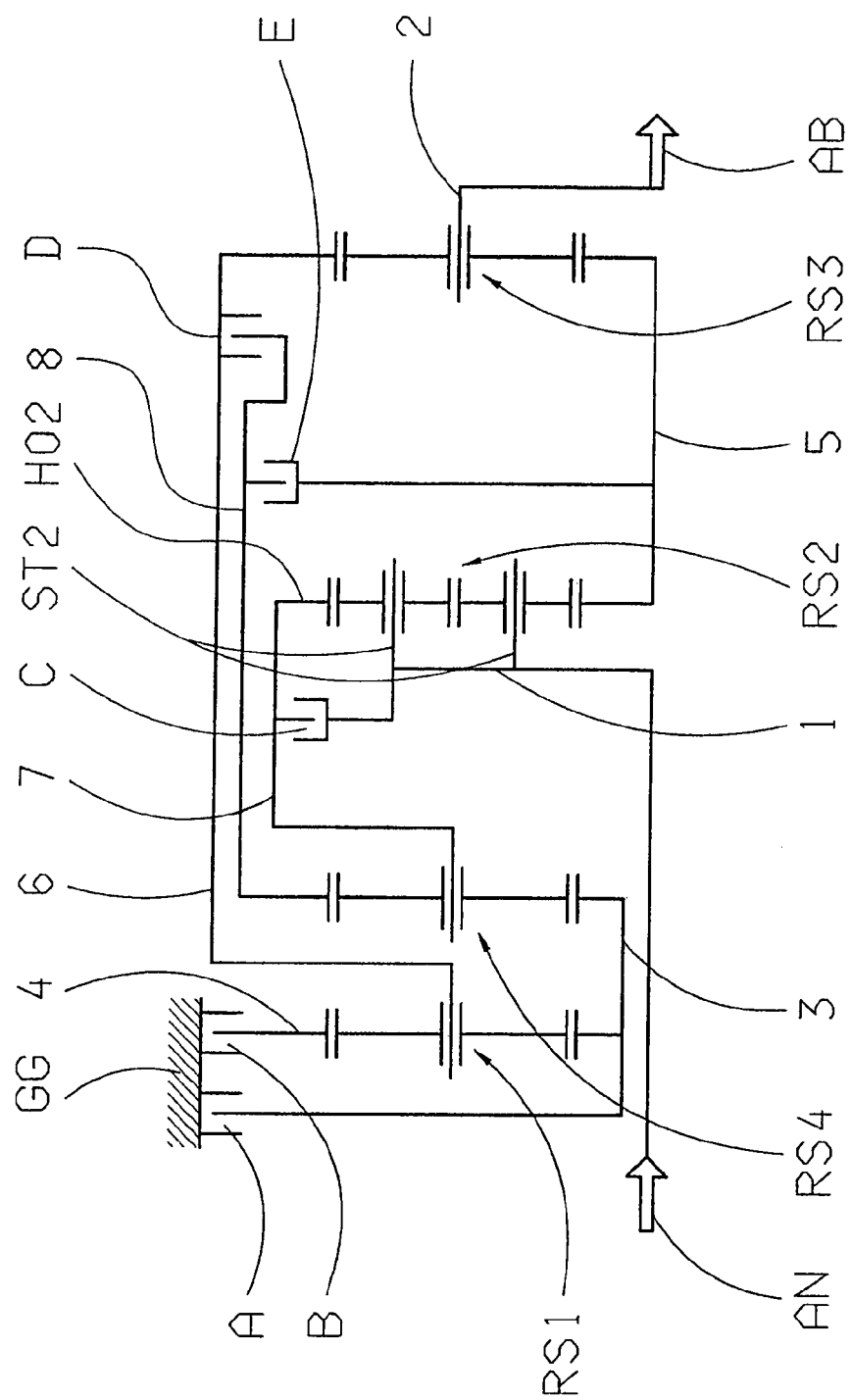
FIG. 3 shows a schematic representation of a third exemplary embodiment of a multi-speed transmission according to the invention.

Two other possibilities for locking the second planetary gearset RS2 by means of the clutch C are disclosed in the exemplary embodiments of a multi-speed transmission according to the invention based on the idea that the clutch C, acting as third shifting element of the transmission, locks the second planetary gearset RS2 in the shifted or engaged status. FIG. 2 shows a second exemplary embodiment and FIG. 3 shows a third exemplary embodiment of a multi-speed transmission according to the invention, once more in simplified schematic representation; both are based on the first exemplary embodiment that was described in detail with reference to FIG. 1.

In FIG. 2, it can be easily seen that the only difference with reference to transmission kinematics of the second exemplary embodiment of a multi-speed transmission according to the invention, shown herein and compared with FIG. 1, is that the clutch C is henceforth arranged within the direction of the power flow between the shaft 1 and the shaft 5. In the shifted or engaged status, the clutch C mutually connects henceforth the sun gear SO2 and the carrier ST2 of the second planetary gearset RS2.

It can also be seen in FIG. 2 that the most important difference with reference to the shifting element arrangement within the transmission housing GG in the second exemplary embodiment of a multi-speed transmission according to the invention when compared to FIG. 1, is that the clutch C is, from a spatial perspective, provided within the area located axially between the fourth planetary gearset RS4 and the second planetary gearset RS2. The clutch E is thus arranged axially directly adjacent the second planetary gearset RS2 (on the gear set's side closer the third planetary gearset RS3). The outer disk carrier of the clutch C is connected on its side closer the second planetary gearset RS2 in a rotationally fixed manner to the coupled carrier ST2 and on its side closer the fourth planetary gearset RS4 to the input shaft AN. Accordingly, the outer disk carrier of the clutch C forms henceforth a section of the shaft I of the transmission. Just as in FIG. 1, the inner disk carrier of the clutch C is connected in a rotationally fixed manner to the sun gear SO2 of the second planetary gearset RS2 and consequently also to the sun gear SO3 of the third planetary gearset RS3 and the inner disk carrier of the clutch E. Accordingly, the inner disk carrier of the clutch C forms a section of the shaft 5 of the transmission. A servo of the clutch C (which is not shown in FIG. 2 due to reasons of simplification), is preferably arranged within the cylinder chamber, which is formed by the outer disk carrier of the clutch C, is mounted axially displaceably on the outer disk carrier, rotates permanently at the rotational speed of the shaft 1 or the input shaft AN.

The spatial arrangement and constructive design of the shifting elements of FIG. 1 are otherwise adopted in the exemplary embodiment of a transmission according to the invention shown in FIG. 2, so that a repeated description can be omitted at this point.

In FIG. 3, it can be easily seen that the only difference with reference to the transmission kinematics of the third exemplary embodiment of a multi-speed transmission according to the invention when compared to FIG. 1 is that the clutch C is arranged within the direction of the power flow between the shaft 1 and the shaft 7. In the shifted or engaged state, the clutch C mutually connects henceforth the ring gear HO2 and the carrier ST2 of the second planetary gearset RS2.

In FIG. 3, it can also be seen that the most important difference with reference to the shifting element arrangement within the transmission housing GG1 in the third exemplary embodiment of a multi-speed transmission according to the invention when compared to FIG. 1, is that the clutch C is arranged in spatial perspective within an area located axially between the fourth planetary gearset RS4 and the second planetary gearset RS2. Like in FIG. 2, the clutch E is arranged axially directly adjacent to the second planetary gearset RS2 (on the gearset's side closer the third planetary gearset RS3). The outer disk carrier of the clutch C is connected on its side closer the second planetary gearset RS2 in a rotationally fixed manner to the ring gear HO2 and on its side closer the fourth planetary gearset RS4 to the carrier ST4. Accordingly, the outer disk carrier of the clutch C forms a section of the shaft 7 of the transmission. The inner disk carrier of the clutch C is connected in a rotationally fixed manner to the carrier ST2 of the second planetary gearset RS2 and the input shaft AN. Accordingly, the inner disk carrier of the clutch C henceforth forms a section of the shaft 1 of the transmission. A servo of the clutch C (which is not shown in detail in FIG. 2) is preferably mounted axially displaceably on the inner disk carrier of the clutch C to rotate permanently at the rotational speed of the shaft 1 or the input shaft AN.

The spatial arrangement and constructive design of the shifting elements of FIG. 1 are otherwise adopted in the exemplary embodiment of a transmission according to the invention shown in FIG. 3, so that a repeated description can be omitted at this point.

A schematic shifting diagram, which can be provided for the multi-speed transmission of the invention according to FIGS. 1, 2 and 3, is depicted in FIG. 4.

Three shifting elements are engaged and two shifting elements are disengaged in each gear. In addition to the shifting logic, exemplary values of the respective gear ratios i of the individual gears and the shift ranges φ to be determined based thereon can also be derived from the schematic diagram. The indicated gear ratios i result from the (typical) stationary transmission gear ratios of the four planetary gearsets RS1, RS2, RS3, RS4 of minus 2.00, plus 2.60, minus 3.70, and minus 3.70 [sic]. It can furthermore be inferred from the schematic diagram that double shifting or range shifts can be prevented during sequential shifting, since two gears that are adjacent in the shifting logic, utilize two common shifting elements. The sixth gear is configured as a direct gear.

The first forward gear is implemented by engaging the brakes A and B and the clutch C, the second forward gear is implemented by engaging the brakes A and B and the clutch E, the third forward gear is implemented by engaging the brake B and the clutches C and E, the fourth forward gear is implemented by engaging the brake B and the clutches D and E, the fifth forward gear is implemented by engaging the brake E, and the clutches C and D, the sixth forward gear is implemented by engaging the clutches C, D and E, the seventh forward gear is implemented by engaging the brake A and the clutches C and D, and also the eighth forward gear is implemented by engaging the brake A and the clutches D and E. As it is further apparent from the shifting diagram, the reverse gear is implemented by engaging the brakes A and B and the clutch D.

According to the invention, a startup of the motor vehicle is possible with a shifting element integrated into the transmission. In this connection, a shifting element, which is needed in the first forward gear and in the reverse gear, preferably the brake A or the brake B, is especially suitable. These two brakes A, B are advantageously also required in the second forward gear. If the brake B is used as a starting element integrated into the transmission, even a startup in the first five forward gears and the reverse gear is possible. As is apparent from the schematic diagram, the clutch C can also be used to start in the forward direction and the clutch D can be used as an ring transmission element to start in the reverse direction.

The following moreover applies to the previously depicted or described embodiments of a multi-speed transmission of the invention:

Different gear progressions can also be achieved according to the invention with the same transmission diagram depending on the shifting logic, so that a variation, specifically adapted to the application and/or vehicle, is made possible.

Figure 10:
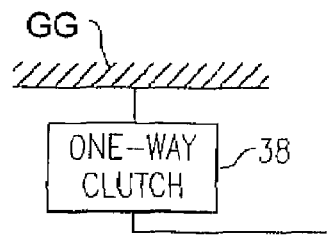
FIG. 10 is a diagrammatic view of an embodiment of the inventive multi-speed transmission having a one-way clutch.

It is moreover possible, as shown in FIG. 10, to provide additional free wheels (one-way clutches 38) at any suitable place in the multi-speed transmission, for example, between a shaft and the housing or, if required, in order to connect two shafts.

Figure 5:
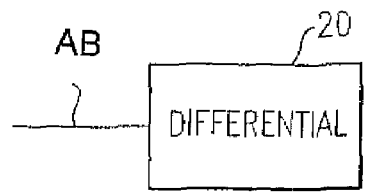
FIG. 5 is a diagrammatic view of an embodiment of the inventive multi-speed transmission having a differential.

An axle differential 20 and/or a central differential can be arranged on the input side or on the output side, as shown in FIG. 5.

Figure 6:
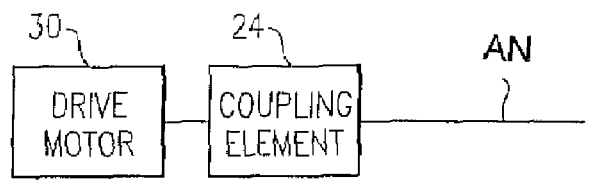
FIG. 6 is a diagrammatic view of an embodiment of the inventive multi-speed transmission with a coupling element and a drive motor.
Figure 7:
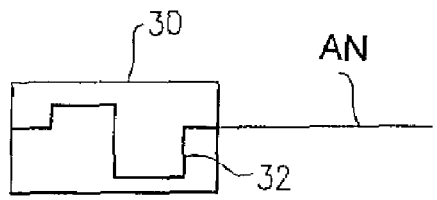
FIG. 7 is a diagrammatic view of an embodiment of the inventive multi-speed transmission with a crankshaft of the drive motor fixed to an input shaft of the multi-speed transmission.
Figure 14:
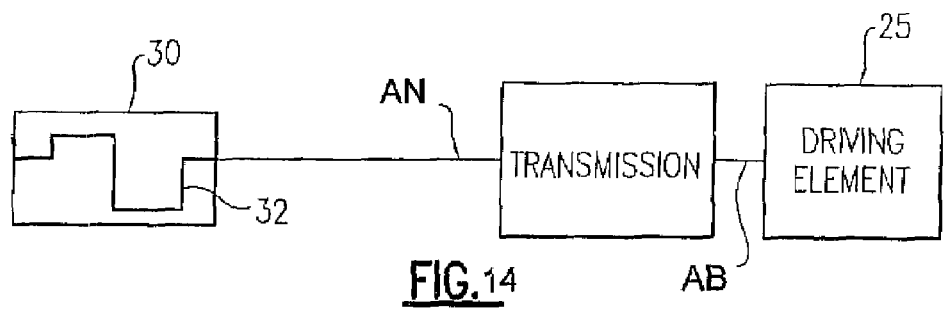
FIG. 14 is a diagrammatic view of another embodiment of the inventive multi-speed transmission with the crankshaft of the drive motor fixed to the input shaft of the multi-speed transmission and the coupling element located behind the multi-speed transmission.

Within the scope of an advantageous further development, as shown in FIG. 6, the input shaft AN can be separated by a starting element (coupling element) 24 from a drive motor 30, if needed, wherein a hydrodynamic converter, a hydraulic clutch, a dry starting clutch, a wet starting clutch, a magnetic powder clutch, or a centrifugal clutch can be used as such a starting element. It is also possible, as shown in FIG. 14, to arrange a starting element (driving element) 25 of this type in the direction of the direction of the power flow behind the transmission, wherein in this case, the input shaft AN is permanently connected to the crankshaft 32 of the drive motor 30 and shown in FIG. 7.

Figure 8:
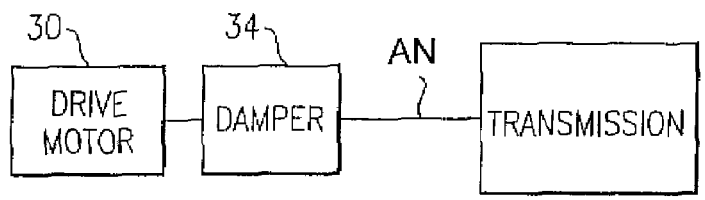
FIG. 8 is a diagrammatic view of an embodiment of the inventive multi-speed transmission having the drive motor communicating with a damper.

The multi-speed transmission of the invention, as shown in FIG. 8, moreover enables the arrangement of a torsional vibration damper 34 between the drive motor 30 and the transmission.

Figure 9:
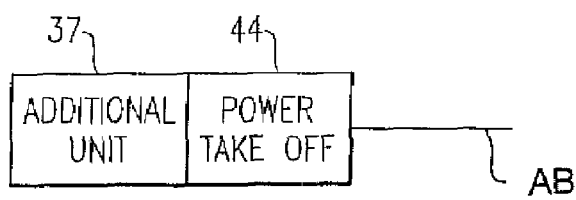
FIG. 9 is a diagrammatic view of an embodiment of the inventive multi-speed transmission with a power take-off for driving an additional unit.
Figure 12:
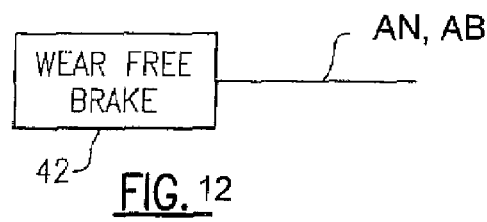
FIG. 12 is a diagrammatic view of a preferred design of the inventive multi-speed transmission having a wear free brake.
Figure 13:
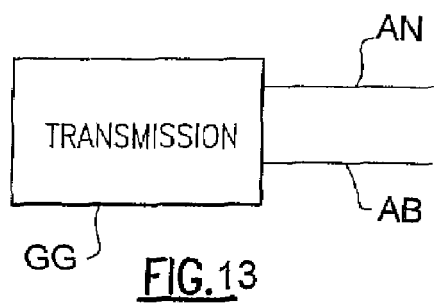
FIG. 13 is a diagrammatic view of a further embodiment of the invention with the input and the output being provided on the same side of the multi-speed transmission housing.

Within the scope of a further embodiment of the invention, as shown in FIG. 12, a wear-free brake 42, such as, for example, a hydraulic or an electric retarder or the like, can be arranged on each shaft, preferably on the input shaft AN or on the output shaft AB, which is of particular significance for the use in commercial motor vehicles. A power take-off 44 can be provided, as shown in FIG. 9, on any shaft, in addition, in order to drive additional units 36 on each shaft, preferably on the input shaft AN or the output shaft AB. Additionally, as shown in FIG. 13, the input and the output are provided on the same side of the housing GG.

The shifting elements used can be configured as load-shifting clutches or brakes. Power-shift clutches or brakes, such as, for example, disk clutches, band brakes and/or cone clutches, can be used. Moreover, positive brakes and/or clutches, such as, for example, synchronizing mechanisms or claw clutches, can also be used as shifting elements.

Figure 11:
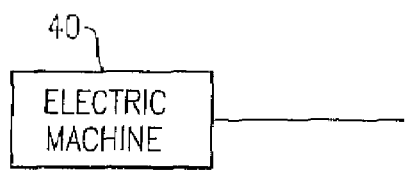
FIG. 11 is a diagrammatic view of an embodiment of the inventive multi-speed transmission with an electric machine.

Another advantage of the multi-speed transmission presented herein in FIG. 11, is that an electric unit (electric machine) 40 can be mounted as a generator and/or as an additional drive motor on each shaft.

Any embodiment configuration, in particular any spatial arrangement of the planetary sets and the shifting elements per se, as well as with respect to each other, is understood to be covered under the protective scope of the claims, as long as it is practical from the technical point of view and does not influence the function of the transmission as disclosed in the claims, even if these embodiments are not explicitly depicted in the FIGS. or described in the disclosure.

Reference Numerals

| | |
|---|---|
| 1 | first shaft |
| 2 | second shaft |
| 3 | third shaft |
| 4 | fourth shaft |
| 5 | fifth shaft |
| 6 | sixth shaft |
| 7 | seventh shaft |
| 8 | eighth shaft |
| A | first shifting element, first brake |
| B | second shifting element, second brake |
| C | third shifting element, first clutch |
| D | fourth shifting element, second clutch |
| E | fifth shifting element, third clutch |
| AB | output shaft |
| AN | input shaft |
| GG | housing |
| RS1 | first planetary gearset |
| HO1 | ring gear of the first planetary gearset |
| SO1 | sun gear of the first planetary gearset |
| ST1 | carrier of the first planetary gearset |
| PL1 | planetary gears of the first planetary gearset |
| RS2 | second planetary gearset |
| HO2 | ring gear of the second planetary gearset |
| SO2 | sun gear of the second planetary gearset |
| ST2 | carrier of the second planetary gearset |
| PL2a | outer planetary gears of the second planetary gearset |
| PL2i | inner planetary gears of the second planetary gearset |
| RS3 | third planetary gearset |
| HO3 | ring gear of the third planetary gearset |
| SO3 | sun gear of the third planetary gearset |
| ST3 | carrier of the third planetary gearset |
| PL3 | planetary gears of the third planetary gearset |
| RS4 | fourth planetary gearset |
| HO4 | ring gear of the fourth planetary gearset |
| SO4 | sun gear of the fourth planetary gearset |
| ST4 | carrier of the fourth planetary gearset |
| PL4 | planetary gears of the fourth planetary gearset |
| i | gear ratio |
| φ | progression ratio |

The invention claimed is:

1. A multi-speed automatic transmission, of a planetary design, for a motor vehicle, the transmission comprising:

an input shaft (AN);

an output shaft (AB);

first, second, third and fourth planetary gearsets (RS1, RS2, RS3, RS4), and each of the first, the second, the third and the fourth planetary gearsets (RS1, RS2, RS3, RS4) comprising a sun gear, a carrier and a ring gear;

at least first, second, third, fourth, fifth, sixth, seventh and eighth rotatable shafts (1,2,3,4,5,6,7,8); and first, second, third, fourth and fifth shifting elements (A, B, C, D, E) whose selective engagement creates different gear ratios between the input shaft (AN) and the output shaft (AB) so that eight forward gears and at least one reverse gear can be implemented;

wherein the carrier (ST2) of the second planetary gear set (RS2) is permanently connected to the input shaft (AN) and forms the first shaft (1);

the carrier (ST3) of the third planetary gear set (RS3) is permanently connected to the output shaft (AB) and forms the second shaft (2);

the sun gear (SO1) of the first planetary gear set (RS1) is permanently connected to the sun gear (SO4) of the fourth planetary gear set (RS4) and forms the third shaft (3);

the ring gear (HO1) of the first planetary gear set (RS1) forms the fourth shaft (4);

the sun gear (SO2) of the second planetary gear set (RS2) is permanently connected to the sun gear (SO3) of the third planetary gear set (RS3) and forms the fifth shaft (5);

the carrier (ST1) of the first planetary gear set (RS1) is permanently connected to the ring gear (HO3) of the third planetary gear set (RS3) and forms the sixth shaft (6);

the ring gear (HO2) of the second planetary gear set (RS2) is permanently connected to the carrier (ST4) of the fourth planetary gear set (RS4) and forms the seventh shaft (7);

the ring gear (HO4) of the fourth planetary gear set (RS4) forms the eighth shaft (8);

the first shifting element (A) is arranged between the third shaft (3) and a transmission housing (GG);

the second shifting element (B) is arranged between the fourth shaft (4) and the transmission housing (GG);

the third shifting element (C) is arranged, in a direction of power flow, between one of the fifth shaft (5) and the seventh shaft (7), the first shaft (1) and the fifth shaft (5), and the first shaft (1) and the seventh shaft (7);

the fourth shifting element (D) is arranged, in the direction of power flow, between the sixth shaft (6) and the eighth shaft (8); and the fifth shifting element (E) is arranged, in the direction of power flow, between the fifth shaft (5) and the eighth shaft (8).

2. The multi-speed transmission according to claim 1, wherein a first forward gear results from engagement of the first shifting element (A), the second shifting element (B), and the third shifting element (C);

a second forward gear results from engagement of the first shifting element (A), the second shifting element (B), and the fifth shifting element (E);

a third forward gear results from engagement of the second shifting element (B), the third shifting element (C), and the fifth shifting element (E);

a fourth forward gear results from engagement of the second shifting element (B), fourth shifting element (D), and fifth shifting element (E);

a fifth forward gear results from engagement of the second shifting element (B), the third shifting element (C), and the fourth shifting element (D);

a sixth forward gear results from engagement of the third shifting element (C), the fourth shifting element (D), and the fifth shifting element (E);

a seventh forward gear results from engagement of the first shifting element (A), the third shifting element (C), and the fourth shifting element (D);

an eighth forward gear results from engagement of the first shifting element (A), the fourth shifting element (D), and the fifth shifting element (E), and the reverse gear results from engagement of the first shifting element (A), the second shifting element (B), and the fourth shifting element (D).

3. The multi-speed transmission according to claim 1, wherein the first planetary gearset (RS1), the third planetary gearset (RS3) and the fourth planetary gearset (RS4) are negative-planetary gearsets, and the second planetary gear set (RS2) is a positive planetary gearset.

4. The multi-speed transmission according to claim 1, wherein the first planetary gearset (RS1), the second planetary gearset (RS2), the third planetary gearset (RS3) and the fourth planetary gearset (RS4) are co-axial and arranged, in an axial direction, in a sequential order of:

the first planetary gearset (RS1), the fourth planetary gearset (RS4), the second planetary gearset (RS2), and the third planetary gearset (RS3).

5. The multi-speed transmission according to claim 1, wherein the input shaft (AN) is one of axially parallel and at an angle to the output shaft (AB), and one of the first planetary gearset (RS1) and the third planetary gearset (RS3) is located on a side of the transmission housing (GG) adjacent to a drive motor which is connected to the input shaft (AN) of the transmission.

6. The multi-speed transmission according to claim 1, wherein the input shaft (AN) is co-axial with the output shaft (AB), and the first planetary gearset (RS1) is located on a side of the transmission housing (GG) adjacent a drive motor which is connected to the input shaft (AN).

7. The multi-speed transmission according to claim 1, wherein no more than one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) passes, in an axial direction, through a center of each of the first planetary gearset (RS1), the second planetary gearset (RS2), the third planetary gearset (RS3) and the fourth planetary gearset (RS4).

8. The multi-speed transmission according to claim 1, wherein only two of the first planetary gearset (RS1), the second planetary gearset (RS2), the third planetary gearset (RS3) and the fourth planetary gearset (RS4) are axially centrally passed through by one of the first shaft (1), the second shaft (2), the third shaft (3), the fourth shaft (4), the fifth shaft (5), the sixth shaft (6), the seventh shaft (7) and the eighth rotatable shaft (8) of the transmission.

9. The multi-speed transmission according to claim 8, wherein one of the first shaft (1) and the input shaft (AN) axially centrally passes through the first planetary gear set (RS1) and the fourth planetary gear set (RS4).

10. The multi-speed transmission according to claim 8, wherein one of the first shaft (1) and the input shaft (AN) axially centrally passes through the second planetary gear set (RS2) and third planetary gear set (RS3).

11. The multi-speed transmission according to claim 1, wherein the third shaft (3) is rotatably supported by a hub fixed on the transmission housing (GG).

12. The multi-speed transmission according to claim 1, wherein at least one of the first shifting element (A) and the second shifting element (B) is located, in spatial terms, at least partially in an area radially above one of the first planetary gearset (RS1) and the fourth planetary gearset (RS4).

13. The multi-speed transmission according to claim 1, wherein the first shifting element (A) is arranged, in spatial terms, axially parallel the second shifting element (B), and at least one friction element of the second shifting element (B) located is closer to the fourth planetary gearset (RS4) than a friction element of the first shifting element (A).

14. The multi-speed transmission according to claim 1, wherein the first shifting element (A) and the second shifting element (B) are radially, at least partially superimposed in a spatial perspective.

15. The multi-speed transmission according to claim 1, wherein the third shifting element (C) is axially located, at least partially, between the second planetary gearset (RS2) and the third planetary gearset (RS3).

16. The multi-speed transmission according to claim 1, wherein the third shifting element (C) is axially located, at least partially, between the fourth planetary gearset (RS4) and the second planetary gearset (RS2).

17. The multi-speed transmission according to claim 1, wherein the third shifting element (C) is axially located directly on the second planetary gear set (RS2).

18. The multi-speed transmission according to claim 1, wherein the fourth shifting element (D) is axially arranged, in spatial terms, at least partially between the second planetary gearset (RS2) and the third planetary gearset (RS3).

19. The multi-speed transmission according to claim 1, wherein the fourth shifting element (D) is axially directly adjacent the third planetary gearset (RS3).

20. The multi-speed transmission according to claim 1, wherein the fifth shifting element (E) is axially located, at least partially, between the second planetary gearset (RS2) and the third planetary gearset (RS3).

21. The multi-speed transmission according to claim 1, wherein the fifth shifting element (E) is axially located, at least in partially, between the third shifting element (C) and the fourth shifting element (D).

22. The multi-speed transmission according to claim 1, wherein the fifth shifting element (E) is axially, directly adjacent the second planetary gearset (RS2).

23. The multi-speed transmission according to claim 1, wherein the fourth shifting element (D) and the fifth shifting element (E) are axially located substantially side by side, and a disk set of the fourth shifting element (D) is closer to the third planetary gear set (RS3) than a disk set of the fifth shifting element (E).

24. The multi-speed transmission according to claim 1, wherein the fourth shifting element (D) and the fifth shifting element (E) are radially located, at least partially superimposed, and a disk set of the fourth shifting element (D) is radially located, at least partially over a disk set of the fifth shifting element (E).

25. The multi-speed transmission according to claim 1, wherein the fourth shifting element (D) and the fifth shifting element (E) are substantially axially side by side, and a disk set of the fifth shifting element (E) is closer to the third planetary gear set (RS3) than a disk set of the fourth shifting element (D).

26. The multi-speed transmission according to claim 1, wherein the fourth shifting element (D) and the fifth shifting element (E) have a common disk carrier which is connected to the ring gear (HO4) of the fourth planetary gearset (RS4).

27. The multi-speed transmission according to claim 1, wherein the third shifting element (C) and the fifth shifting element (E) are axially located substantially side by side, and a disk set of the third shifting element(C) is closer to the second planetary gear set (RS2) than a disk set of the fifth shifting element (E).

28. The multi-speed transmission according to claim 1, wherein the third shifting element (C) and the fifth shifting element (E) have a common disk carrier, which is connected to the sun gear (SO2) of the second planetary gear set (RS2) and the sun gear (SO3) of the third planetary gear set (RS3).

29. The multi-speed transmission according to claim 1, wherein at least one one-way clutch is located between the transmission housing (GG) and at least one of the input shaft (AN), the output shaft (AR), the first shaft (1), the second shaft (2), the third shaft (3), the fourth shaft (4), the fifth shaft (5), the sixth shaft (6), the seventh shaft (7) and the eighth shaft (8).

30. The multi-speed transmission according to claim 1, wherein an input and an output of the transmission are provided on opposite sides of the housing (GG).

31. The multi-speed transmission according to claim 1, wherein an input and an output of the transmission are located on a common side of the housing (GG).

32. The multi-speed transmission according to claim 1, wherein at least one of an axle differential and a distributor differential is located on one of the input shaft (1) and the output shaft (2).

33. The multi-speed transmission according to claim 1, wherein an coupling element is located, in a direction of power flow, between a drive motor of the motor vehicle and the input shaft (AN).

34. The multi-speed transmission according to claim 33, wherein the coupling element is one of a hydrodynamic converter, a hydraulic clutch, a dry starting clutch, a wet starting clutch, a magnetic powder clutch, and a centrifugal clutch.

35. The multi-speed transmission according to claim 1, wherein the vehicle starts via one of the first shifting element (A), the second shifting element (B), the third shifting element (C) and the fourth shifting element (D) of the transmission, and the input shaft (AN) is permanently connected to a crankshaft of a drive motor via one of a rotationally fixed manner and a rotationally elastic manner.

36. The multi-speed transmission according to claim 35, wherein starting of the vehicle, in the forward direction and the reverse direction, occurs via engagement of one of the first shifting element (A) and the second shifting element (B).

37. The multi-speed transmission according to claim 1, wherein one of a wear free brake, a power take-off for driving an additional unit, and an electric machine is secured to at least one of the input shaft (AN), the output shaft (AB), the first shaft (1), the second shaft (2), the third shaft (3), the fourth shaft (4), the fifth shaft (5), the sixth shaft (6), the seventh shaft (7) and the eighth shaft (8) of the transmission, and the electric machine is at least one of a generator and an additional drive unit.

38. The multi-speed transmission according to claim 1, wherein each of the first shifting element (A), the second shifting element (B), the third shifting element (C), the fourth shifting element (D) and the fifth shifting element (E) is one of a friction-lock clutch, a friction-lock brake, a disc clutch, a band brake and a conical clutch, a form-locking clutch, a form-locking brake, a conical clutch and a claw clutch.

\* \* \* \* \*